March 13, 1945.  E. B. CUSHMAN  2,371,130
CABLE TENSION REGULATOR
Filed March 17, 1944
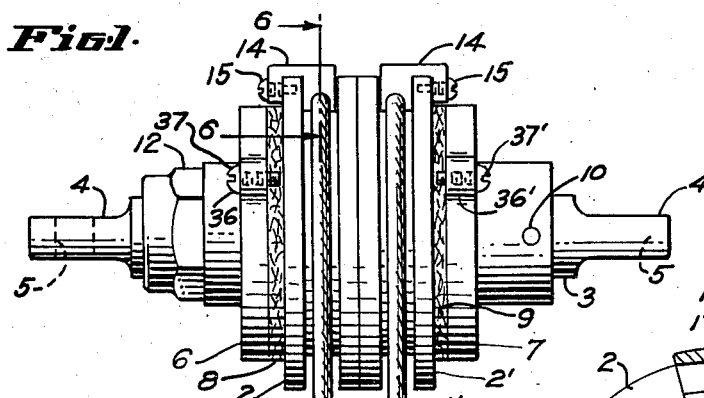
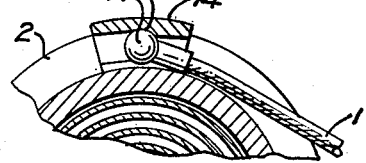
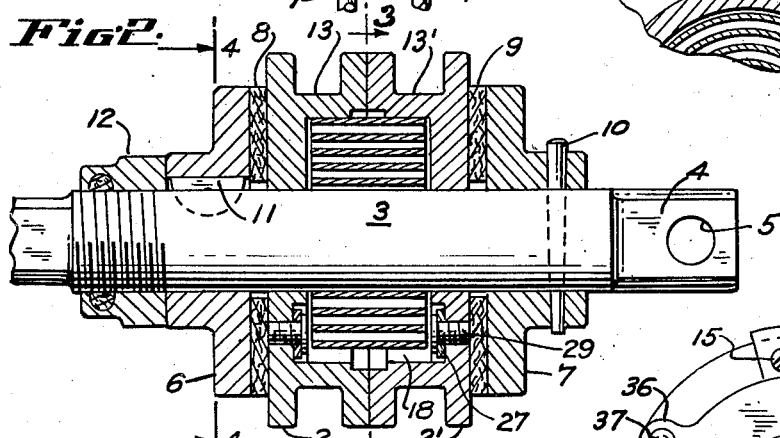
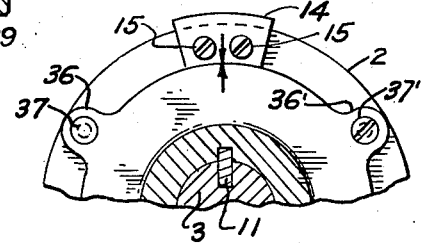
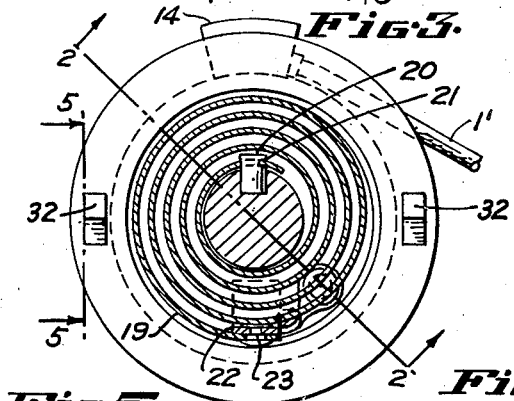
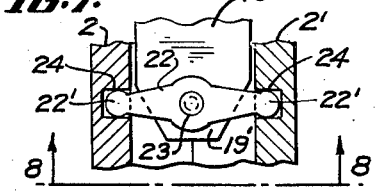
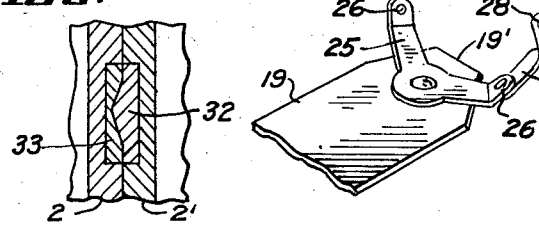
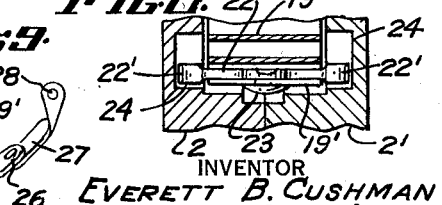
INVENTOR
EVERETT B. CUSHMAN
BY J.A. Bried
ATTORNEY Patented Mar. 13, 1945

2,371,130

UNITED STATES PATENT OFFICE 2,371,130

CABLE TENSION REGULATOR

Everett B. Cushman, Roscoe, Calif., assignor to Sturgess, Inc., Glendale, Calif., a corporation of California Application March 17, 1944, Serial No. 526,917

10 Claims. (Cl. 74—501)

This invention relates to means for automatically controlling the working tension in a pair of control cables or their equivalent as principally used on aircraft for moving the control surfaces or other movable parts by the pilot.

The principal object of the invention is to provide a small compact regulator unit which will substantially maintain the normal working tension in a pair of control cables as caused by relative expansion and/or contraction of the cables and/or fuselage or other structure upon which the control cables are installed, and upon an extra working tension being applied to either of the cables the regulator unit will instantly become locked against further movement of both cables until the tension on both of them again becomes equal.

There are always two control cables extending to each device to be operated—such as a rudder, aileron, elevator, engine control, or any other movable part, one to pull it one way, and the other to pull it the opposite way, and the fundamental requirement is that while the spring normally keeps the tension in both cables equal, the instant an operative pull is put on either cable in excess of the normal, it is instantly locked out from control of the spring and functions like a continuous cable without any interposed spring; and it stays locked out until its working pull is slacked off again to the "normal" or spring tension, and whereupon the spring again automatically takes charge of the tension to compensate for the slow changes in length of air plane fuselage versus the cables as continually goes on during great changes in the temperature to which planes are exposed.

Briefly described the regulator comprises a pair of flanged cable drums revolvably mounted on a fixed shaft between two fixed brake disks. The cables are attached respectively to the drums and a spiral spring within the drums tends to wind up the cables to keep them taut and at even tension. A pull on either cable revolves one drum slightly with respect to the other, and as a result the drums are relatively forced apart by small cams positioned between the confronting surfaces of the drums, and thereby forced against the two fixed brake disks or abutments to at once lock them against further rotation. When the extra pull on the pulled cable is slacked off and its tension substantially equals the tension of the other cable, the cams become released and the drums are free again from the brakes and the cables are subject to control by the tension of the spiral spring.

In the accompanying drawing,

Fig. 1 is a side view of a cable tension regulator embodying my invention.

Fig. 2 is a longitudinal central section of the device taken along the line 2—2 of Fig. 3.

Fig. 3 is a cross section taken along the line 3—3 of Fig. 2.

Fig. 4 is a fragmentary section as seen from the line 4—4 of Fig. 2.

Fig. 5 is a fragmentary section taken along the line 5—5 of Fig. 3 showing the wedge cam plates positioned between the confronting rims of the cable drums.

Fig. 6 is a fragmentary side view as seen from the line 6—6 of Fig. 1 showing the cable end securing blocks.

Fig. 7 is a detail showing the rocker arm connection of the spiral spring to the two cable drums.

Fig. 8 is an end view of Fig. 7 taken from the line 8—8 thereof.

Fig. 9 is a perspective view of one of the ways of connecting the spring rocker arm to the cable drums.

The drawing shows one way of carrying out the invention, and in which drawing the two control cables are indicated at 1 and 1' respectively, the two flanged drums, part way around which the cables pass and are secured respectively thereto are designated 2, 2', the shaft upon which the drums are revolvably mounted is shown at 3 and flattened at its ends as at 4 and provided with anchoring holes 5 for rigidly securing it to the aircraft structure.

Also mounted on the shaft, at opposite outer sides of the drums are two hubs or flanges 6, 7 each preferably faced at its inner side with a friction brake disk or plate 8, 9 which is secured to its adjacent flange as by rivets not shown, and which friction plates are normally in contact with the drums but still permit free rotation of the cable drums.

One of the flanges 7 is preferably fixed to the shaft as by a pin 10, while the other flange is splined to the shaft as at 11 and a lock-nut 12 is screwed on the shaft against it so that the distance between the flanges may be finely adjusted.

The ends of the cables are secured, each within the groove 13, 13' of the drums by any desired means, but here indicated by a slotted block 14 inverted over the cable and secured to the outer side of the outer flange of the drum as by screws 15. Each of these blocks is formed with a spherical seat 16 embracing a ball fixture 17 brazed or otherwise secured to the end of the cable, all so that the connection will permit freedom of the cable to turn and adjust itself to the tension to be put upon it (see Fig. 6).

The drums are hollowed out and open at their inner surfaces to form a spring chamber 18 within which is a relatively wide spiral spring, or heavy clock spring 19 coiled around the shaft and with its inner end secured to the shaft as by being apertured and hooked over a pin 20 projecting from the shaft. The pin is preferably undercut as at 21 to prevent the spring when under tension from coming off of the pin.

The outer end of the spring is connected to both drums through the intermediary of a rocker arm 22 so that when the spring is wound up both cables will tend to wind upon the drums equally, still, due to the rocker arm connection either drum is able to revolve forward or backward a short distance when the pull on either cable is in excess of the other.

One rocker arm connection of the outer end 19' of the spring to the two drums 2, 2' is shown in Figs. 7 and 8 wherein the rocker arm 22 is of flat form pivoted at 23 to the spring adjacent its extreme end, and the opposite ends 22' of the rocker arm are of rounded or ball form and extend beyond the width of chamber 18 into radially disposed grooves 24 formed on the confronting walls of the chamber.

Other equivalent connection of the spring through a rocker or compensating arm may be used, such for instance as the one shown in Figs. 2 and 3 and in perspective in Fig. 9 wherein the rocker arm 25 is linked at its end as at 26 by links 27 which are apertured at their ends as at 28 to receive screws or pins 29 to secure them to the inner walls of the drums.

Recessed within the contacting inner rims of the drums are two pairs of wedge-shaped cam plates 32 and 33. These cam plates are complementally formed so that upon turning either drum slightly with respect to the other the wedge faces of the cam plates will tend to force the drums apart in great frictional contact with the brake disks 8, 9 to thereby at once lock both drums against rotation, but as soon as the drums are turned back to line up the cam plates again as shown in Fig. 5 the drums will be free to rotate again, and in which position of the cam plates the rocker arm 22 will stand at right angles across the spring and the tension on both cables will be equal.

Since in use of the device as a compensator for elongation or contraction of the cables relative to the structure upon which the installation is used, the drums only revolve (together) a fraction of a turn in one direction or in the opposite direction from a central or normal position at which the cables are both tensioned to the desired working tension, (by means of suitable turnbuckles or other take up means in the lines not shown) it follows that suitable limit stops should be provided to limit the total rotative movement of the cable drums relative to the fixed shaft, or at least one limit stop to prevent the tensioned spring from totally unwinding when the cables are not attached. One arrangement suitable for this purpose is shown in Fig. 4 in which the edge of brake flange 6 is provided with two spaced projecting lugs 36, 36' through each of which passes a stop pin or screw 37, 37' the inner ends of which stop respectively against opposite edges of cable securing block 14. Of course, any other stop arrangement to carry out the requirement may be used instead.

From the foregoing description and explanation of the functions of the parts the operation of the device will be clear to those skilled in the art, and hence no reiteration is thought required.

I claim:

1. A cable tension regulator comprising a shaft, a pair of cable drums revolvably mounted on said shaft, means adapted for securing a cable to each drum respectively, spring means arranged to wind up the cables on the drums when the shaft is held from turning, and means operated by a difference in tension on the two cables locking the drums against unwinding movement.

2. A cable tension regulator comprising a shaft, a pair of cable drums revolvably mounted on said shaft, means adapted for securing a cable to each drum respectively, spring means arranged to wind up the cables on the drums when the shaft is held from turning, and means operated by a difference in tension on the two cables locking the drums against unwinding movement, said spring means being common to both cables.

3. A cable tension regulator comprising a shaft, a pair of cable drums revolvably mounted on said shaft, means adapted for securing a cable to each drum respectively, spring means arranged to wind up the cables on the drums when the shaft is held from turning, and means operated by a difference in tension on the two cables locking the drums against unwinding movement, said spring means being a clock spring type of spiral spring common to both cables.

4. A cable tension regulator comprising a shaft, a pair of cable drums revolvably mounted on said shaft, means adapted for securing a cable to each drum respectively, a spiral spring arranged to wind up the cables on the drums when the shaft is held from turning, and means operated by a difference in tension on the two cables locking the drums against unwinding movement comprising means connecting one end of the spring to said shaft, and means connecting the other end of the spring to both drums in a manner adapted to compensate for unequal rotative movement of said drums caused by unequal pull on said cables.

5. A cable tension regulator comprising a shaft, a pair of cable drums revolvably mounted on said shaft, means adapted for securing a cable to each drum respectively, a spiral spring arranged to wind up the cables on the drums when the shaft is held from turning, and means operated by a difference in tension on the two cables locking the drums against unwinding movement comprising means connecting one end of the spring to said shaft, a lever pivoted centrally to the other end of the spring and extending transversely thereof, and means pivotally connecting the outer ends of said lever respectively with said drums.

6. In a structure as set out in claim 1, said drums being hollow and in rim contact, and said spring means being within the hollow of the drums, and the means locking the drums against movement comprising abutment means secured to the shaft at the outer sides of said drums and between which they normally turn, and a pair of opposing cam elements interposed between the drums formed in a manner tending to force the drums apart and against said abutment means when the drums are turned relatively.

7. In a structure as set out in claim 1, said drums being hollow and in rim contact, and said spring means being within the hollow of the drums, and the means locking the drums against movement comprising abutment means secured to the shaft at the outer sides of said drums and between which they normally turn, and a pair of opposing cam elements interposed between the drums formed in a manner tending to force the drums apart and against said abutment means when the drums are turned relatively, and means for regulating the effective pressure of said abutment means against the drums.

8. A cable tension regulator comprising a shaft, a pair of cable drums revolvably mounted on said shaft, means adapted for securing a cable to each drum respectively, spring means arranged to wind up the cables on the drums when the shaft is held from turning, and means operated by a difference in tension on the two cables locking the drums against unwinding movement, and means limiting the revolution of said drums with respect to the shaft.

9. A cable tension regulator comprising a shaft, means adapted for anchoring said shaft against rotation, a pair of cable drums rotatably mounted side by side on said shaft, said drums being hollowed out at their confronting sides, a pair of abutments secured to the shaft at the outer sides of the drums and between which the drums are normally revolvable, stop means limiting the degree of rotation of the drums, a spiral spring within the hollow of the drums with one end secured to the shaft, a lever centrally pivoted at the other end of the spring and extending transversely thereof, and means pivotally connecting the outer ends of the lever to the drums respectively, and cam means between the drums arranged to force the drums outwardly against said abutments when the drums are turned relatively, and means adapted for securing a cable to each drum for winding therearound by said spiral spring.

10. A cable tension regulator comprising a shaft, means adapted for anchoring said shaft against rotation, a pair of cable drums rotatably mounted side by side on said shaft, said drums being hollowed out at their confronting sides, a pair of abutments secured to the shaft at the outer sides of the drums and between which the drums are normally revolvable, stop means limiting the degree of rotation of the drums, a spiral spring within the hollow of the drums with one end secured to the shaft, a lever centrally pivoted at the other end of the spring and extending transversely thereof, and means pivotally connecting the outer ends of the lever to the drums respectively, and cam means between the drums arranged to force the drums outwardly against said abutments when the drums are turned relatively, and means adapted for securing a cable to each drum for winding therearound by said spiral spring, said abutments being in the form of flanges, and a disk of friction brake material between each flange and the outerside of each drum respectively.

EVERETT B. CUSHMAN.